United States Patent Office 3,839,508
Patented Oct. 1, 1974

3,839,508
N-CHLOROSULFONYL-CARBAMOYL
PHOSPHONIC ACID ESTERS
Theodor Auel, Hurth-Kendenich, Germany, assignor to
Knapsack Aktiengesellschaft, Knapsack, near Cologne,
Germany
No Drawing. Filed May 18, 1972, Ser. No. 254,462
Claims priority, application Germany, May 21, 1971,
P 21 25 143.4
Int. Cl. A01n 9/36; C07f 9/40
U.S. Cl. 260—943                7 Claims

ABSTRACT OF THE DISCLOSURE

The invention provides novel N-chlorosulfonylcarbamoyl phosphonic acid esters of the general formula (I)

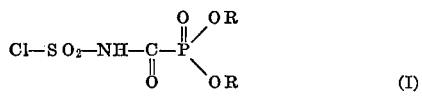
(I)

in which R stands for a saturated or unsaturated aliphatic or cycloaliphatic radical having between 1 and 12 carbon atoms, or stands for an aryl radical.

The esters are made by reacting a compound of the general formula (III)

(III)

in which R has the meaning given above, with chlorosulfonyl isocyanate at a temperature between about —20 and +25° C. After completion of the reaction, the N-chlorosulfonylcarbamoyl phosphonic acid ester is isolated.

---

The present invention relates to N-chlorosulfonylcarbamoyl phosphonic acid esters of the general formula (I)

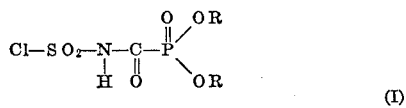
(I)

in which R stands for a saturated or unsaturated aliphatic or cycloaliphatic radical having between 1 and 12 carbon atoms, or stands for an aryl radical. The formula (I) compounds of the present invention also comprise compounds the aliphatic or aromatic radical of which is mono- or polyhalogenated, or the aromatic radical of which has alkyl, alkoxy, alkylmercapto and/or nitro-group substituents of low molecular weight attached thereto. Preferred formula (I) compounds include the dimethyl, diethyl, di-n-butyl, di-(2-ethylhexyl), diphenyl and didodecyl esters of N-chlorosulfonyl-carbamoyl phosphonic acid.

Compounds of the general formula (I) have not been disclosed heretofore in the literature, nor has the process for making them been described earlier.

In "Journal of the American Chemical Society," volume 78, page 1661 (1956), it has merely been reported that the reaction of alkyl or aryl isocyanates with phosphonic acid diesters results in the formation of carbamoyl phosphonates of the general formula (II)

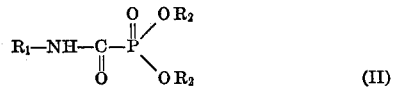
(II)

in which $R_1$ stands for an alkyl radical or aryl radical and $R_2$ stands for an alkyl group. This known reaction is effected at a temperature of approximately 135° C. or at lower temperatures with the use of a basic catalyst, such as $Na_2CO_3$, NaCN, tributylamine or similar catalysts.

The process of the present invention for making N-chlorosulfonyl-carbamoyl phosphonic acid esters of the general formula (I)

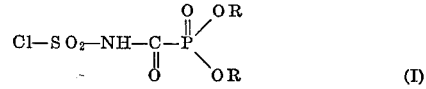
(I)

in which R stands for a saturated or unsaturated aliphatic or cycloaliphatic radical having between 1 and 12 carbon atoms, or stands for an aryl radical, comprises reacting a compound of the general formula (III)

(III)

in which R has the meaning given above, with a substantially molar proportion of chlorosulfonyl isocyanate at a temperature between about —20 and +25° C., in the presence or absence of an inert solvent or diluent and with cooling, if desired, and, following termination of the reaction, isolating the resulting N-chlorosulfonyl-carbamoyl phosphonic acid ester.

The useful starting materials preferably include phosphorous acid esters, the aliphatic or aromatic radical of which is mono- or polyhalogenated. The aromatic radical may also be substituted by alkyl, alkoxy, alkylmercapto and/or nitro-groups of low molecular weight. The starting materials more preferably include the phosphorous acid dimethyl, diethyl, di-n-butyl, di-(2-ethylhexyl), diphenyl and didodecyl esters.

A preferred embodiment of the process of the present invention comprises reacting the starting materials at a temperature between —10 and +10° C. As already mentioned above, the reaction may be carried out in the presence of a solvent or diluent including, for example, chlorinated aliphatic or aromatic hydrocarbons having at most 8 carbon atoms. These hydrocarbons include as preferred representatives methylene chloride, chloroform, carbon tetrachloride, dichloroethane, tetrachloroethane, di-, tri- or tetrachloroethylene or chlorobenzene.

Unchlorinated compounds, such as gasoline, benzene, toluene or xylene are also useful solvents.

The N-chlorosulfonyl-carbamoyl phosphonic acid esters of the present invention are commonly obtained as a crystalline precipitate in the reaction mixture and are isolated therefrom in conventional manner, for example by suction-filtration. If use is made of a diluent, the ester may also be isolated by evaporating the diluent under vacuum and recovering the ester residue.

The following equation illustrates the reaction of the present invention:

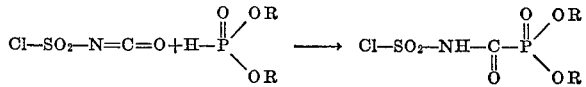

As can be seen, an additive combination occurs between the phosphorous acid ester and the —N=C-double bond of the isocyanate. As compared with the conventional reaction of alkyl isocyanates with phosphonic acid esters, the above addition reaction takes an unexpected course as the reaction of the chlorosulfonyl isocyanate with the phosphorous acid ester would well have been expected to proceed with dehydrochlorination. A further feature distinguishing the present process over the art resides in the fact that the reaction is effected in the absence of any catalyst and at temperatures, which should preferably not exceed 25° C. In view of the strongly exothermal reaction, it is necessary to subject the reaction mixture to efficient external cooling. The reaction mixture should in no case be allowed to exceed a temperature of 25° C.

so as to avoid appreciable decomposition of the reaction product. The decomposition at higher temperatures has been found to result in an uncontrollable, extremely vigorous reaction accompanied by the evolution of sulfur dioxide.

The N-chlorosulfonyl-carbamoyl phosphonic acid esters obtained by the present invention are substantially pure and normally need not be purified further in a separate step. They are sensitive to hydrolysis and are therefore required to be stored in closed containers with the exclusion of moisture. The novel compounds of the present invention are interesting intermediates for use in the production of plant protective agents and insecticides, and for use in the manufacture of products regulating the growth of plants. The process of the present invention can be carried out under commercially attractive conditions as the chlorosulfonyl isocyanate starting material is known to be obtainable in commercial quantities from cyanogen chloride and sulfur trioxide.

EXAMPLE 1

A four-necked flask fitted with stirrer, reflux cooler, dropping funnel and internal thermometer was used and 141.5 grams (1 mol) of chlorosulfonyl isocyanate were mixed therein with 100 ml. of dry methylene chloride in the presence of an inert gas, and the mixture was cooled down to $-10°$ C. 110 grams (1 mol) of dimethyl phosphite were added dropwise with intense agitation and cooling so as to prevent the reaction mixture from exceeding a temperature of $0°$ C. After substantially 50% of the dimethyl phosphite was added, the N - chlorosulfonyl-carbamoyl phosphonic acid dimethylester began to separate in the form of white crystals. After the addition of the total quantity of dimethyl phosphite, the reaction mixture was allowed to stand for substantially 30 minutes to complete the reaction, and the methylene chloride was distilled off under vacuum at a fairly low temperature. The resulting crystalline mass moist with solvent was delivered under inert gas to a closed frit and freed therein from adhering solvent and minor proportions of liquid by-products, under vacuum. The N - chlorosulfonyl-carbamoyl phosphonic acid dimethylester melted at 72–74° C. and was obtained in a yield of 171 grams, or 68% of the theoretical.

EXAMPLE 2

407 Grams (2.88 mols) of chlorosulfonyl isocyanate were mixed in a manner analogous to that described in Example 1 with 250 ml. of petroleum ether, which had a boiling range between 30 and 50° C. and the resulting mixture was reacted while cooling and stirring with 394 grams (2.88 mols) of diethyl phosphite, at temperatures between 0 and 20° C. The addition of minor proportions of diethyl phosphite did already initiate the separation of the N-chlorosulfonyl-carbamoyl phosphonic acid diethylester, and the separation went on until complete during the addition of the diethyl-phosphite, because of the insolubility of the ester in petroleum ether. The resulting white crystals were freed from petroleum ether by suction filtration under inert gas and dried under vacuum. The N-chlorosulfonyl-carbamoyl phosphonic acid diethylester so made melted at 80–81° C. and was obtained in a yield of 562 grams, or 72% of the theoretical.

EXAMPLE 3

130 Grams (0.67 mol) of di-n-butyl phosphite were added at $-15°$ C. and in a manner analogous to that described in Example 1 to a solution of 94.8 grams (0.67 mol) of chlorosulfonyl isocyanate in 70 ml. of petroleum ether (boiling range: 30–50° C.). Following the addition of substantially 50% of the di-n-butyl phosphite, the N-chlorosulfonyl-carbamoyl phosphonic acid di-n-butylester began to separate in the form of white crystals. After the addition of the total quantity of di-n-butyl phosphite and completion of the reaction, the petroleum ether was distilled off under vacuum at a fairly low temperature. Liquid by-products which were found to adhere to the crystals were removed by suction filtration under vacuum, in a closed frit. The N-chlorosulfonyl-carbamoyl phosphonic acid di-n-butylester so made melted at 32–33° C. and was obtained in a yield of 184 grams, or 82% of the theoretical.

EXAMPLE 4

62 Grams (0.438 mol) of chlorosulfonyl isocyanate dissolved in 130 ml. of petroleum ether were reacted at 0° C. and in a manner analogous to that described in Example 1 with 134.5 grams (0.438 mol) of di-(2-ethylhexyl)-phosphite. After the reaction was complete, the petroleum ether was distilled off under vacuum, and the N-chlorosulfonyl-carbamoyl phosphonic acid di-(2-ethylhexyl) ester was obtained in the form of a colorless undistillable oil. The yield was 195 grams, or 100% of the theoretical.

EXAMPLE 5

83.7 Grams (0.2 mol) of di-n-dodecyl phosphite melting at 31° C. were dissolved in 150 ml. of petroleum ether and the resulting solution was mixed dropwise at $+10°$ C. with 28.3 grams (0.2 mol) of chlorosulfonyl isocyanate, in a manner analogous to that described in Example 1. The N-chlorosulfonyl-carbamoyl phosphonic acid didodecylester commenced to separate as a white crystalline mass. After the reaction was complete, the petroleum ether was distilled oil under vacuum. The crystals were delivered to a closed frit and higher-boiling liquids which adhered thereto, were removed by suction filtration under vacum. The N-chlorosulfonyl-carbamoyl phosphonic acid didodecylester so made melted at 40° C. and was obtained in a yield of 107.5 grams, or 96% of the theoretical.

EXAMPLE 6

90 Grams (0.637 mol) of chlorosulfonyl-isocyanate were reacted at 20° C. and in a manner analogous to that described in Example 1 with 140 grams (0.637 mol) of diphenyl phosphite which was used in admixture with 100 ml. of petroleum ether. After the reaction was complete, the petroleum ether was distilled off under vacuum. The residue was N-chlorosulfonyl-carbamoyl-phosphonic acid diphenylester which was obtained in the form of a colorless oil. After standing for 24 hours at room temperature, the oil solidified and gave a white crystalline mass. Traces of liquid which adhered to the crystals were removed therefrom by suction filtration under vacuum, in a closed frit. The N-chlorosulfonyl-carbamoyl phosphonic acid diphenylester so made melted at 61° C. and was obtaind in a yield of 227 grams, or 95% of the theoretical.

EXAMPLE 7

The N-chlorosulfonyl-carbamoyl phosphonic acid diethylester obtained in Example 2 was dissolved in methylene chlororide. By the addition of stoichiometric proportions of water and while cooling to establish a temperature between 0 and 20° C., the ester was hydrolyzed in accordance with the following reaction equation to give carbamoyl phosphonic acid diethylester:

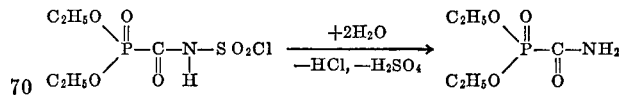

As reported in German published Specification DOS 2,040,367, it is possible to use the carbamoyl phosphonic acid diethylester for regulating the growth of Ligustrum ovalifolium.

The claims:
1. N-chlorosulfonyl-carbamoyl phosphonic acid esters of the general formula (I)

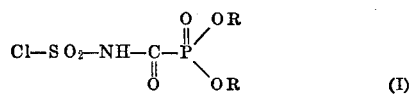

in which R stands for an alkyl radical having between 1 and 12 carbon atoms, or phenyl radical.

2. The N-chlorosulfonyl-carbamoyl phosphonic acid dimethylester.

3. The N-chlorosulfonyl-carbamoyl phosphonic acid diethylester.

4. The N-chlorosulfonyl-carbamoyl phosphonic acid di-n-butylester.

5. The N-chlorosulfonyl-carbamoyl phosphonic acid di-(2-ethylhexyl)-ester.

6. The N-chlorosulfonyl-carbamoyl phosphonic acid didodecylester.

7. The N-chlorosulfonyl-carbamoyl phosphonic acid diphenylester.

References Cited

UNITED STATES PATENTS 3,413,382  11/1968  Ulrich _____ 260—943

ANTON H. SUTTO, Primary Examiner

U.S. Cl. X.R.

71—86; 260—970, 984